United States Patent [19]

Coscia et al.

[11] 4,141,827

[45] Feb. 27, 1979

[54] PROCESS FOR CLARIFYING COAL WASH WATERS

[75] Inventors: Anthony T. Coscia, South Norwalk; Michael N. D. O'Connor, Norwalk, both of Conn.

[73] Assignee: American Cyanamid Company, Stamford, Conn.

[21] Appl. No.: 792,745

[22] Filed: May 2, 1977

Related U.S. Application Data

[63] Continuation-in-part of Ser. No. 735,577, Oct. 26, 1976, abandoned.

[51] Int. Cl.² .............................................. B01D 21/01
[52] U.S. Cl. ................................................... 210/54
[58] Field of Search ..................... 210/52–54; 260/29.4 UA; 526/23, 54

[56] References Cited

U.S. PATENT DOCUMENTS

| | | | |
|---|---|---|---|
| 3,014,896 | 12/1961 | Colwell et al. | 210/54 C |
| 3,023,162 | 2/1962 | Fordyce et al. | 210/54 C |
| 3,578,586 | 5/1971 | Gal et al. | 210/49 |
| 3,864,312 | 2/1975 | Suzuki et al. | 210/54 C |
| 3,897,333 | 7/1975 | Field et al. | 210/54 C |
| 3,907,758 | 9/1975 | Sackman et al. | 210/54 C |
| 3,943,114 | 3/1976 | Hoke | 210/54 C |
| 3,956,122 | 5/1976 | Coscia et al. | 210/54 C |
| 4,024,328 | 5/1977 | Zweigle | 210/54 C |

*Primary Examiner*—Frank A. Spear, Jr.
*Assistant Examiner*—Peter A. Hruskoci
*Attorney, Agent, or Firm*—William J. van Loo

[57] ABSTRACT

Use of quaternized Mannich bases of low molecular weight polyacrylamides is highly effective in clarifying coal wash waters.

5 Claims, No Drawings

PROCESS FOR CLARIFYING COAL WASH WATERS

CROSS-REFERENCE TO RELATED APPLICATIONS

This application is a continuation-in-part of application Ser. No. 735,577, filed Oct. 26, 1976 now abandoned. This application is also related to applications Ser. Nos. 792,744 and 792,746, filed on even date herewith. Ser. No. 792,444 is directed to clarifying iron ore slimes, Ser. No. 792,446 is directed to clarifying raw water while the present application is directed to clarifying coal wash waters.

This invention relates to an improved process for clarifying waste waters arising from washing coal. More particularly, this process relates to such a process in which there is used as clarifying agent a polyacrylamide of certain molecular weight range chemically modified to provide quaternized dimethylaminomethyl groups on the amide groups.

Recent developments in the field of water-soluble polymers have led to materials that are effective in water treatment to remove undesirable materials suspended therein. The separation of suspended particles from aqueous suspensions thereof is generally referred to as "flocculation". Such general term can include a wide range of aqueous systems varying from a minor amount of inorganic solids in aqueous suspension, such as raw water, to high concentrations of organic wastes, such as sewage sludges. Because of this widely diverse nature of the solids-water systems, the agents provided for such utility are generally provided in a form that offers versatile performance, i.e. suitable for use with a wide variety of solids-water systems.

For certain solids-water systems, such as raw waters, these polymeric agents are used to clarify the water by removal of inorganic solids suspended therein. For other solids-water systems, such as sewage sludges, the polymeric agents are used primarily to dewater the sludge so that the solids may be readily disposed of without prohibitive amounts of water being associated therewith. These distinct applications of the polymeric agents give rise to different requirements as to the nature of the agents employed.

One prior art teaching with respect to certain prior art flocculants is that, in general, increased effectiveness arises with increased molecular weight of the polymeric agent employed, see U.S. Pat. No. 3,738,945 for example. Another prior art teaching with respect to another type of prior art flocculants is that there is a certain high molecular weight value at which maximum effectiveness occurs and above which effectiveness remains essentially unchanged, see U.S. Pat. No. 3,897,333 for example. Accordingly, one seeking an effective flocculant for the various solids-water systems contemplated by such application of polymeric agents would provide such agent in high molecular weight range.

Typically, polymeric agents that are used in flocculation applications have molecular weights in excess of about 200,000, usually in the range of about 500,000 to several million, and in different solids-water systems, such as sewage sludges, frequently higher, depending upon the chemical nature of the polymeric agent. Most products that have been available for commerical use have been in the high molecular weight range so as to provide versatile utility in the wide variety of applications in which they are useful. Although the commerical products possess some degree of versatility as to usage, they do not necessarily provide the optimum performance in any given application.

Certain polymeric flocculants can be made directly from suitable reactants, such as reaction products of epichlorohydrin and dimethylamine or free-radical polymerization products of such monomers as diallyldimethylammonium chloride. Other polymeric flocculants may be made by preparing a polymer from a reactive monomer not containing certain desired functionalities and subsequently modifying the pre-formed polymer to provide the functionalities desired. In this procedure the functionality of the pre-formed polymer can be varied in a number of respects but the degree of polymerization as it affects molecular weight of the modified polymer is determined by the polymer pre-formed.

Acrylamide is a highly reactive monomer that is widely used to provide pre-formed polymers that can be readily modified chemically to provide alternative or additional functionality for specific end-uses. Thus, acrylamide polymers may be controllably hydrolyzed to provide acrylic acid functions on the polymer structure and provide an anionic polymer. Alternatively, formaldehyde and dimethylamine can be reacted with the amide groups of the polymer to provide substituent dimethylaminomethyl functionality thereon and provide a cationic polymer. Because of the high reactivity of acrylamide monomer, however, the pre-formed polyacrylamide used for subsequent chemical modification is usually in the molecular weight range of about 200,000 to 5,000,000, since such is the degree of polymerization normally obtained. To obtain polyacrylamide of molecular weights outside this range, special preparative procedures are necessary. For higher molecular weight polyacrylamides, for example, highly purified monomer is required. Although procedures for obtaining lower molecular weight polyacrylamides are available, use of such techniques is not generally considered with respect to flocculation applications because of the preference for high molecular weight polymers.

The intrinsic viscosity of a polymer is obtained by measuring the viscosity of varying concentrations of the polymer in a specific solvent and extrapolating to a value as zero concentration, which is the value designated as "intrinsic viscosity". The viscosity is the resistance of liquid forms of the polymer to flow and is a characteristic property measuring the combined effects of adhesion and cohesion. From the intrinsic viscosity can be calculated the molecular weight of a polymer by use of appropriate equations. As is apparent, the intrinsic viscosity molecular weight relationship of one polymer type will differ from that of another polymer type. Accordingly, the intrinsic viscosity of a polyacrylamide of a specific degree of polymerization will differ from that of a chemically-modified polyacrylamide of the same degree of polymerization. The fact remains, however, that as the molecular weight or the degree of polymerization of a polymer increases, the intrinsic viscosity thereof also increases in any particular series.

A quaternized dimethylaminomethyl-polyacrylamide has been previously disclosed for the treatment of sewage sludges, see U.S. Pat. No. 3,897,333. The useful polymer disclosed is one stated to have an intrinsic viscosity of at least 0.5 deciliters per gram and the examples used to illustrate the invention employ polymers having intrinsic viscosities of 1.0 and 2.5 deciliters per gram. For a quaternized dimethylaminomethyl-polyacrylamide containing at least 50 mol percent of such quaternized groups to have an intrinsic viscosity of at least 0.5 deciliters per gram, the pre-formed polyacrylamide must have a molecular weight of about 130,000 as a minimum and to conform to exemplified species must have a molecular weight of about 350,000 to 1,500,000. The degree of polymerization for such polymers would be at least 1,800 and, as exemplified, from about 5,000 to 20,000. At this range of degrees of polymerization, the polymers of the reference are said to exhibit equivalent performance in dewatering of sewage sludges, regardless of the actual degree of polymerization in such range. Absent any further teaching by the reference, one would be led to believe that the same range of intrinsic viscosities would be the most effective range for other flocculation applications.

In accordance with the present invention, there is provided a process for settling suspended solids in coal washing waste water which comprises mixing with said water an effective amount of a polymer consisting essentially of repeating units of the structure

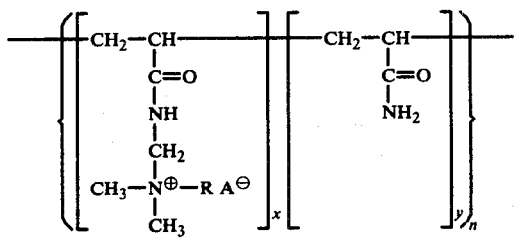

wherein $A^\ominus$ is an anion, R is alkyl of 1-3 carbons or hydroxyalkyl of 2-3 carbons, x is a mol fraction of at least about 50 percent, y is a mol fraction of up to about 50 percent and represents unmodified acrylamide units, and n in an integer in the range of about 100 to about 1,600 to provide the chemically-modified polyacrylamide with an intrinsic viscosity in the range of about 0.1 to 0.45 deciliters per gram when measured in 3M NaCl at 30° C. and thereafter settling the solids to provide a clarified supernatant liquid.

The process provides an improved process for clarifying coal washing waste waters which offers the following advantages:

1. The polymers used in the process of the present invention develop maximum effectiveness in coal washing waste waters at low molecular weight, thus eliminating disadvantages associated with providing high molecular weight polymers.

2. Because preparation of low molecular weight polymers takes less time than does preparation of high molecular weight polymers, greater productivity is obtained for a reactor of given capacity in a specified time period.

3. Because low molecular weight polymers provide low solution viscosity, chemical modification can be achieved at higher polymer concentrations than in the case of high molecular weight polymers.

4. Because chemical modification can be achieved at high polymer concentration, chemical modification is more readily and completely effected.

5. Because the polymer used in the process of the present invention is provided at high polymer concentration, shipping cost per unit weight of polymer are reduced.

6. The low molecular weight polymers of the present invention provide small absorbent flocs which can absorb additional suspended solids of the coal washing waste water and provide greater clarification than do high molecular weight polymers which provide large non-absorbent flocs.

7. The polymers used in the process of the present invention offer cost-performance advantages over other polymeric flocculants because of their processing advantages.

In order to prepare polymers for use in the process of the present invention, it is first necessary to prepare a low molecular weight polyacrylamide in aqueous solution. By "polyacrylamide" is meant a polymer which consists essentially of repeating units of acrylamide. Although it is generally preferred to provide a homopolymer of acrylamide for optimum results in use, it is also possible to replace part of the acrylamide units with another monomer in amounts which do not interfere with the advantageous performance of the polymer in coal washing waste water clarification. Other monomers that may replace part of the acrylamide monomer include acrylonitrile, methyl methacrylate, styrene, diallyldimethylammonium chloride, methacrylamide, N,N-dimethylacrylamide, and acrylic acid. If an acidic monomer is used, is should constitute less than 10 mol percent of the polymer. It is generally preferable to introduce a high degree of chemical modification in the polyacrylamide and, therefore, the amount of comonomer should be minimized in order to achieve such preference. The polyacrylamide, accordingly, will consist essentially of at least 50 mol percent of acrylamide groups that have been chemically modified to provide quaternized dimethylaminomethyl groups thereon and, preferably, the balance of unmodified acrylamide groups or of comonomer units that do not adversely affect the performance of the polymer in the clarification of coal washing waste waters. Both unmodified acrylamide units and units derived from another comonomer may be present with the required content of quaternized dimethylaminomethyl acrylamide groups.

In preparing the polyacrylamide, an aqueous solution of about 10 to 50, preferably 15 to 30, more preferably 20 to 25 weight percent of acrylamide or monomer mixture, is employed. A number of techniques are known which can be employed to provide the desired low molecular weight polymer. Use of initiator contents of at least about 0.1 weight percent are effective. The use of high reaction temperatures such as at least 50° C., preferably about 70° C. to 100° C., is also effective using the initiator concentration stated. A chain transfer agent, such as isopropanol, is also effective but is not necessary. The instances wherein an impurity, such as ionic copper, is present, a chelating agent, such as ethylenediamine tetraacetic acid may be used to combine with this impurity. However, the presence of an impurity and the use of a chelating agent is not necessary to prepare the low molecular weight polymer.

Free radical initiators useful at the concentration specified include, for example, ammonium persulfate, potassium persulfate, benzoyl peroxide, bromobenzoyl peroxide, t-butyl hydroperoxide, and hydrogen peroxide in the presence of ferrous ion.

As indicated, the initiated polymer solution is heated to 50° C. or higher and held at the selected temperature until the polyacrylamide of desired molecular weight is obtained. The polyacrylamide should have a degree of polymerization in the range of about 100 to 1,600. In the case of a homopolymer of acrylamide, this will correspond to a molecular weight of about 7,000 to 110,000.

After the desired polyacrylamide is provided, the reaction solution is cooled to about 40° C. to effect chemical modification with formaldehyde and dimethylamine.

Formaldehyde may be used as a 20-60 weight percent aqueous solution and dimethylamine is used as a 20-65 weight percent aqueous solution. The molar amount of formaldehyde employed must be sufficient to chemically modify enough acrylamide groups to provide at least 50 mol percent of modified acrylamide groups in the final polymer but the amount of formaldehyde may be sufficient to provide a polymer consisting essentially of modified acrylamide groups, preferably a polymer containing 60-90 mol percent of modified acrylamide groups. The amount of dimethylamine employed in the chemical modification of the acrylamide groups will constitute the molar equivalent amount of dimethylamine plus about 1 to 10 mol percent excess, preferably about 5 mol percent excess. The reaction to provide chemical modification is preferably conducted at about 40° C. for sufficient time to complete the reaction, generally in about two hours. Temperature and appropriate time modifications may be made in accordance with conventional procedures for providing this chemical modification, which is also called Mannich base formation.

After the reaction with formaldehyde and dimethylamine is complete, the reaction product is quaternized with an alkylating agent to a pH in the range of about 4 to 7. Preferred alkylating agents are dimethyl sulfate and methyl chloride but other alkylating agents may be used. The quaternization is preferably carried out to involve essentially all of the dimethylaminomethyl groups provided but complete reaction is not required so long as the minimum quantity of quaternized groups is provided. In the event that all of the dimethylaminomethyl acrylamide groups are not quaternized, the unquaternized dimethylaminomethyl acrylamide groups will represent a part of the polymer composition.

With respect to the individual steps of polymer preparation, chemical modification of the polyacrylamide to provide Mannich base modification, and quaternization of the reaction product, the conditions of reaction and useful reactants are known. The process of preparation involves a specific combination of the individual steps involving a low molecular weight polyacrylamide as the polymer undergoing chemical modification which results in a novel polymer possessing unexpected properties when used in clarification of coal washing waste waters and provides unexpected processing advantages not possible when the conventional high molecular weight polyacrylamides are suitably processed.

The product obtained by the process of preparation described is a stable product which contains from about 50 to 100 mol percent of quaternized dimethylaminomethyl acrylamide groups. The degree of polymerization of the chemically modified polyacrylamide will be substantially the same as that of the starting polyacrylamide since no increase in backbone polymer molecular weight is known to arise as a result of the chemical modification effected. Accordingly, the degree of polymerization of the product polymer will range from about 100 to 1,600. As a result of the chemical modification of the polyacrylamide, the molecular weight of the repeating units will be increased depending upon the extent to which chemical modification is effected and, accordingly, the product polymer will have a higher molecular weight than the starting polyacrylamide although the degree of polymerization is unchanged. Also, as a result of the chemical modification of the polyacrylamide, the resulting product will have different rheological properties from those of the starting polyacrylamide and consequently the intrinsic viscosity values of the starting and product polymers will differ. The intrinsic viscosity of the polymer used in the process of the invention will be in the range of about 0.1 and 0.45, preferably 0.3 to 0.45, deciliters per gram when measured in 3 molar sodium chloride at 3° C.

The coal washing waste waters for which the process of the invention is useful are those which generally contain up to about 100,000 parts per million of inorganic solids of particle size up to about 2 microns, generally about 500 to 50,000 parts per million of such solids. To carry out the process of the present invention, into such a water is mixed an effective amount of the useful polymer described above. An effective amount is that amount which provides the desired level of clarification of the waste water. Generally, such amount will range from about 0.1 to 1,000 parts per million parts of suspended solids, perferably about 0.5 to 100 ppm.

After the polymer has been mixed with the waste water, the solids are settled to provide a clarified supernatant liquid which may be separated from the settled solids by suitable means, such as by decantation, filtration, centrifugation and the like. The particular method of recovering the clarified supernatant liquid is not critical since the process of the present invention effectively settles the suspended solids.

The invention is more fully illustrated in the examples which follow wherein all parts and percentages are by weight unless otherwise specified.

EXAMPLE 1

The following example illustrates a process for manufacturing a polymer containing aminomethylated acrylamide groups quaternized with dimethylsulfate.

226 pounds of deionized water, 0.087 pounds of ethylene diamine tetraacetic acid, disodium dihydrate salt and 0.87 pounds of isopropyl alcohol are charged to a clean reactor which is then sealed. Agitation is started and the charge is heated to 70° ± 2° C. under a stream of nitrogen. At 70° C., a 5.16 weight percent aqueous solution of ammonium persulfate (i.e., 15,000 ppm based on acrylamide) is added as rapidly as possible, the temperature is readjusted to 70° C. if necessary, and then a 50 weight percent aqueous acrylamide solution is metered in during 2 hours, while maintaining the temperature at 70° ± 2° C. The amount of acrylamide charged is calculated to give a 20 weight percent aqueous polymer solution. After all the acrylamide has been added, the batch is held at 70° 1 C. for another hour in order to complete the polymerization, then the nitrogen flow is stopped and isopropyl alcohol is distilled off at a batch temperature of 70°-75° C. and a pressure of 225 mm. Hg. Distilling off 0.8 to 0.9 weight percent of the batch load removes 90-95 weight percent of the isopropyl alcohol as a 22 weight percent aqueous solution (Sp. Gr. 0.967). After reducing the batch to a temperature below 50° C., the batch weight is adjusted by adding an amount of deionized water equal to the weight of isopropyl alcohol solution removed during stripping. Then a premixed solution of 100 mole percent each of formaldehyde and dimethylamine based on the amount of acrylamide containing 5 mole percent excess dimethylamine is added as rapidly as possible. The dimethylamine-formaldehyde solution should be premixed and cooled below 40° C.

After holding for two hours, the batch temperature is readjusted to 35° C. and then 100 mole percent of dimethylsulfate based on the amount of dimethylamine is pumped in as rapidly as possible while maintaining the batch at 35° to 40° C. to a final pH of 6.0 ± 0.2. After the dimethylsulfate has been added and the pH is stable at pH 6.0 ± 0.2, the batch is drummed off.

EXAMPLE 2

The following example illustrates another process for manufacturing a polymer of this invention without the use of a chain transfer agent and without purging the reactor with nitrogen.

A. Preparation of the Polyacrylamide Backbone 738 lb. deionized water and 0.38 lb. EDTA (disodium dihydrate, 1000 ppm on monomer) are charged to a clean reactor and the pH is adjusted to 4.5 with 10% sulfuric acid solution. The reactor is sealed and the batch is heated to reflux during 1 hr. After 1 hr., 0.22 lb. of ammonium persulfate initiator is added and then 2.02 lb. of the initiator and 941 lb. of 39.7% acrylamide monomer solution (at pH 4.3) are metered in simultaneously during 90 mins. while maintaining steady reflux. After the monomer and initiator solutions have been added the batch is held at reflux for 30 minutes to complete the polymerization and then the batch temperature is reduced to 35°–40° C.

B. Preparation of the Aminomethylated Polyacrylamide Quaternized Polymer

At 35° C., a premixed solution of 532.75 lb. of a 37 weight percent formaldehyde solution and 779.88 lb. of a 40 weight percent dimethylamine solution (1:1:1.05 mole ratio of amide:formaldehyde:amide) is added as rapidly as possible with no cooling. The batch is held 3 hrs. Then the batch temperature is reduced to 20° C. and 698 lb. of dimethylsulfate is metered in at a temperature of 35° C. until the pH is reduced to 5 ± 0.5. After the dimethylsulfate has been added and the pH is stable the batch may be drummed off.

EXAMPLE 3

In this example a coal washing waste water containing 40,000 to 50,000 parts per million of suspended solids as silica and clay was employed to illustrate the ability of various polymers to clarify such water. To one liter portions of the waste water were mixed varying dosages of the polymer under test in separate runs and the solids were allowed to settle. After settling was complete, the turbidity of the supernatant liquid was then determined. From these runs was determined the polymer dosage necessary to achieve a given turbidity value in the supernatant.

Two samples of quaternized dimethylaminomethyl polyacrylamide in accordance with the present invention and prepared following the procedure of Example 1 were evaluated, the first having an intrinsic viscosity of 0.27 dl./g. and the second having an intrinsic viscosity of 0.34 dl./g.

For comparison purposes, two polymers obtained by reacting epichlorohydrin with dimethylamine to the same molecular weights as the backbone polyacrylamides of the polymers of the invention were evaluated in the same manner. Results are given in Table I.

Table I

| Clarification of Coal Washing Waste Waters | | | |
|---|---|---|---|
| | | Dosage[1] to Achieve Turbidity of | |
| Polymer | Intrinsic Viscosity | 300 J.T.U. | 100 J.T.U. |
| Example 1 | 0.27 | 23 | 35 |
| Example 1 | 0.34 | 35 | 47 |
| | Molecular Weight | | |
| Comparative 1 | 45,000 – 50,000 | 73 | 88 |
| Comparative 2 | 75,000 | 57 | 105 |
| [1]ppm | | | |

These results show that polymers of the present invention require significantly lower dosages to achieve a given residual turbidity than do the prior art polymers. It should be noted that the polymer of the invention of lower intrinsic viscosity is effective at lower dosage than is the polymer of the invention of higher intrinsic viscosity.

EXAMPLE 4

The procedure of Example 3 was again followed except that the solids in the coal washing waste water was mostly mica and clay minerals. The polymer dosage required for a specific value of optical transmission of the supernatant was determined.

Results are given in Table II.

Table II

| Transmission of Clarified Coal Wash Waste Waters | | | |
|---|---|---|---|
| | | Dosage[1] To Achieve Transmission of | |
| Polymer | Intrinsic Viscosity | 50% | 80% |
| Example 1 | 0.27 | 66 | 90 |
| Example 1 | 0.34 | 82 | 98 |
| | Molecular Weight | | |
| Comparative 1 | 45,000 – 50,000 | 150 | 188 |
| Comparative 2 | 75,000 | 108 | 144 |
| [1]ppm | | | |

These results again show that polymers of the present invention require significantly lower dosages to achieve a given transmission of the treated water than do the prior art polymers. It should again be noted that the polymer of the present invention of lower intrinsic viscosity is effective at lower dosage than is the polymer of the invention of higher intrinsic viscosity. Contrary to this, the prior art polymer is more effective at higher molecular weight.

We claim:

1. A process for settling suspended solids in coal washing waste water which comprises mixing with said water an effective amount of a water soluble polymer consisting essentially of repeating units of the structure

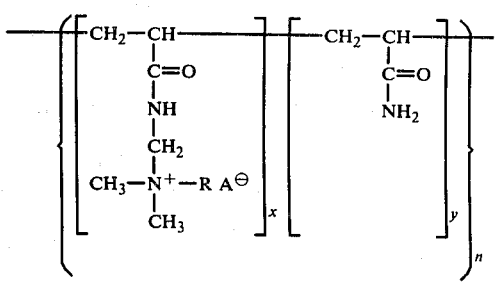

wherein $A^\ominus$ is an anion, R is alkyl of 1–3 carbons or hydroxyalkyl of 2–3 carbons, x is a mol fraction of at least about 50 percent, y is a mol fraction of up to about 50 percent and represents unmodified acrylamide units, and n is an integer in the range of 100 to about 1,600 to provide the chemically-modified polyacrylamide with an intrinsic viscosity in the range of about 0.1 to 0.45 deciliters per gram when measured in 3M NaCl at 30° C. and thereafter settling the solids to provide a clarified supernatant liquid.

2. The process of claim 1 wherein said anion is methosulfate.

3. The process of claim 1 wherein x is a mol fraction of 60–90 percent.

4. The process of claim 1 wherein the intrinsic viscosity is in the range of 0.3 to 0.45.

5. The process of claim 1 wherein the amount of polymer used is in the range of about 0.5 to 100 parts per million parts of suspended solids.

* * * * *